(No Model.)
T. FINIGAN.
BALANCE FOR OBTAINING THE LEA OF YARN.
No. 246,110. Patented Aug. 23, 1881.
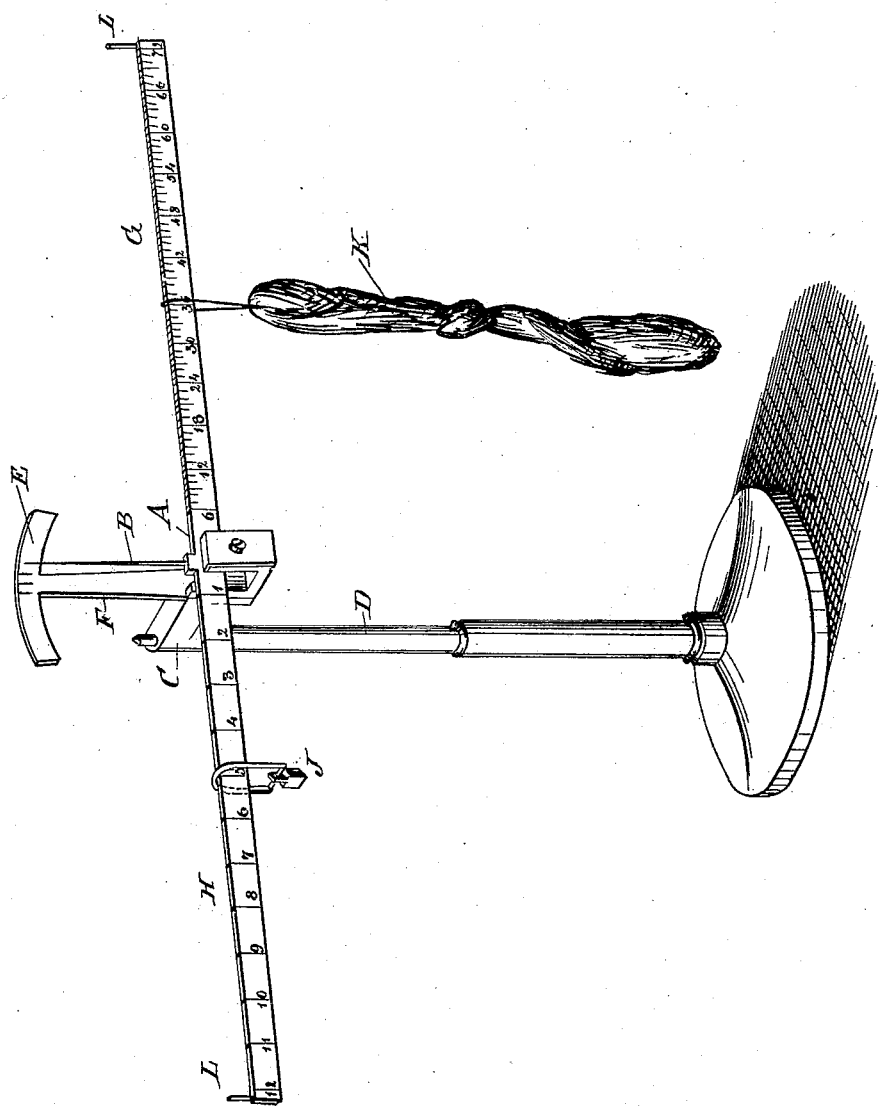
WITNESSES:
INVENTOR:
T. Finigan
BY
ATTORNEYS.

United States Patent Office.

THOMAS FINIGAN, OF MECHANICSVILLE, NEW YORK.

BALANCE FOR OBTAINING THE LEA OF YARN.

SPECIFICATION forming part of Letters Patent No. 246,110, dated August 23, 1881.

Application filed May 16, 1881. (No model.)

*To all whom it may concern:*

Be it known that I, THOMAS FINIGAN, of Mechanicsville, in the county of Saratoga and State of New York, have invented a new and Improved Balance for Ascertaining the Lea of Yarns and Threads, of which the following is a specification.

The object of my invention is to provide a new and improved balance for ascertaining the lea of yarns and threads—that is, the number of leas of thread or yarn to one pound.

The invention consists in a balanced scale-beam provided at one end with a graduated scale, indicating the number of leas, and at the other end with a graduated scale with larger subdivisions, indicating the ply or number of strands of the thread, a movable unit weight being suspended from the latter end of the beam, whereas a certain length of the thread or yarn to be tested is suspended from the other end of the beam.

In the accompanying drawing a perspective view of my improved balance for ascertaining the lea of threads or yarns is shown.

Similar letters of reference indicate corresponding parts.

A beam, A, provided with a central pointer, B, is balanced on the arm C of a standard, D, provided with a segmental plate, E, on an upright, F, and provided with graduations, so as to enable the experimenter to see when the beam is completely balanced. One end, G, of the beam A is provided with a graduated scale, which is properly numbered and provided with close subdivisions for indicating the leas, and the other end, H, of the beam is provided with a numbered graduated scale having larger subdivisions for indicating the ply or number of strands of the thread or yarn. A weight, J, is suspended from the end H of the beam A, and a certain length of yarn which is knotted and twisted to form a ball, hank, or bundle, K, is suspended from the end G of the beam. I prefer to take six yards of thread to form the bundle K; but more or less may be taken, the weight J being varied accordingly. The beam A is provided with pins or projections L L at the ends to prevent the weight J and the bundle of yarns from slipping off.

The balance is used as follows: If the thread or yarn is one ply, the weight J is placed on the subdivision 1 of the arm H; if it is two ply, on the subdivision 2, and so on. The ply or number of strands composing the thread or yarn can be ascertained very easily by untwisting it. The hank or bundle K is then placed in such a position on the end G of the beam that it will exactly balance the weight J. The number of the scale at that point at which the bundle K is suspended indicates the leas to a pound of the yarn. In the example shown the thread is five ply, and its lea is thirty-six.

This instrument is very handy and convenient, especially for traveling salesmen and others of the trade. It also is very convenient to ascertain if the threads are being spun to the proper number, for the first six yards that are spun can be cut off and weighed in the manner described above.

Having thus fully described my invention, I claim as new and desire to secure by Letters Patent—

1. A balance for ascertaining the lea of threads and yarns, made substantially as herein shown and described, and consisting of a balanced beam having a graduated scale indicating the lea at one end and a graduated scale indicating the ply or number of strands of the thread or yarn at the other end, as set forth.

2. The combination, with the balanced beam A, provided with a scale indicating the lea of thread at one end and a scale indicating the ply of the thread at the other end, of a movable weight, J, suspended from the end of the beam, with the graduations indicating the ply of the thread, substantially as herein shown and described, and for the purpose set forth.

THOMAS FINIGAN.

Witnesses:
    ROBERT JANNETT,
    SAMUEL G. REA.